United States Patent
Chen et al.

(10) Patent No.: US 8,273,233 B2
(45) Date of Patent: Sep. 25, 2012

(54) METHOD TO REDUCE VOID FORMATION DURING TRAPEZOIDAL WRITE POLE PLATING IN PERPENDICULAR RECORDING

(75) Inventors: Chao-Peng Chen, Fremont, CA (US); Jas Chudasama, Milpitas, CA (US); Situan Lam, San Jose, CA (US); Chien-Li Lin, Fremont, CA (US)

(73) Assignee: Headway Technologies, Inc., Milpitas, CA (US)

( * ) Notice: Subject to any disclaimer, the term of this patent is extended or adjusted under 35 U.S.C. 154(b) by 576 days.

(21) Appl. No.: 12/460,432

(22) Filed: Jul. 17, 2009

(65) Prior Publication Data

US 2011/0011744 A1 Jan. 20, 2011

(51) Int. Cl.
*C25D 5/02* (2006.01)

(52) U.S. Cl. ........................................ 205/119; 205/255

(58) Field of Classification Search .................. 205/118, 205/119, 183, 255
See application file for complete search history.

(56) References Cited

U.S. PATENT DOCUMENTS

| | | | |
|---|---|---|---|
| 5,883,762 A * | 3/1999 | Calhoun et al. | 205/119 |
| 6,776,891 B2 * | 8/2004 | Chen et al. | 205/89 |
| 7,442,267 B1 | 10/2008 | Webb et al. | |
| 7,449,098 B1 | 11/2008 | Mayer et al. | |
| 2005/0098440 A1 * | 5/2005 | Kailasam et al. | 205/183 |
| 2005/0145499 A1 * | 7/2005 | Kovarsky et al. | 205/103 |
| 2007/0008649 A1 * | 1/2007 | Sasaki et al. | 360/126 |
| 2007/0080067 A1 | 4/2007 | Gu et al. | |
| 2007/0177301 A1 * | 8/2007 | Han et al. | 360/126 |

OTHER PUBLICATIONS

Co-pending, U.S. Appl. No. 12/231,756, filed Sep. 5, 2008, "A Method to Make an Integrated Side Shield PMR Head With Non-Conformal Side Gap," assigned to the same assignee as the present invention.
Co-pending, U.S. Appl. No. 12/291,715, filed Nov. 13, 2008, "A Laminated High Moment Film for Head Applications," assigned to the same assignee as the present invention.

* cited by examiner

*Primary Examiner* — Luan Van
(74) *Attorney, Agent, or Firm* — Saile Ackerman LLC; Stephen B. Ackerman (57) ABSTRACT

A method of forming a write pole in a PMR head is disclosed that involves forming an opening in a mold forming layer. A conformal Ru seed layer is formed within the opening and on a top surface. An auxiliary layer made of CoFeNi or alloys thereof is formed as a conformal layer on the seed layer. All or part of the auxiliary layer is removed in an electroplating solution by applying a (−) current or voltage during an activation step that is controlled by activation time. Thereafter, a magnetic material is electroplated with a (+) current to fill the opening and preferably has the same CoFeNi composition as the auxiliary layer. The method avoids Ru oxidation that causes poor adhesion to CoFeNi, and elevated surfactant levels that lead to write pole impurities. Voids in the plated material are significantly reduced by forming a seed layer surface with improved wettability.

21 Claims, 5 Drawing Sheets

METHOD TO REDUCE VOID FORMATION DURING TRAPEZOIDAL WRITE POLE PLATING IN PERPENDICULAR RECORDING

RELATED PATENT APPLICATIONS

This application is related to Ser. No. 12/291,715, filing date Nov. 13, 2008; and Ser. No. 12/231,756, filing date Sep. 5, 2008; both assigned to the same assignee as the current invention and which are herein incorporated by reference in their entirety.

FIELD OF THE INVENTION

The invention relates to a method of forming a main pole layer in a PMR writer that improves wettability of a seed layer and enables write pole plating without using excess surfactant to avoid void formation and an increase in plated impurities thereby improving writer performance and minimizing corrosion.

BACKGROUND OF THE INVENTION

Perpendicular magnetic recording (PMR) has become the mainstream technology for disk drive applications beyond 200 Gbit/in$^2$, replacing longitudinal magnetic recording (LMR) devices. Due to the continuing reduction of transducer size, high moment soft magnetic thin films with a Bs above 22 kG are required for write head applications. PMR uses a magnetic yoke surrounded by field coils that terminates in a single pole that is used for the write head. The write pole must be wide enough at one end to attach to the yoke and narrow enough at the other end to confine the write flux to a very small area typically about 0.1×0.1 microns.

Figure 1:
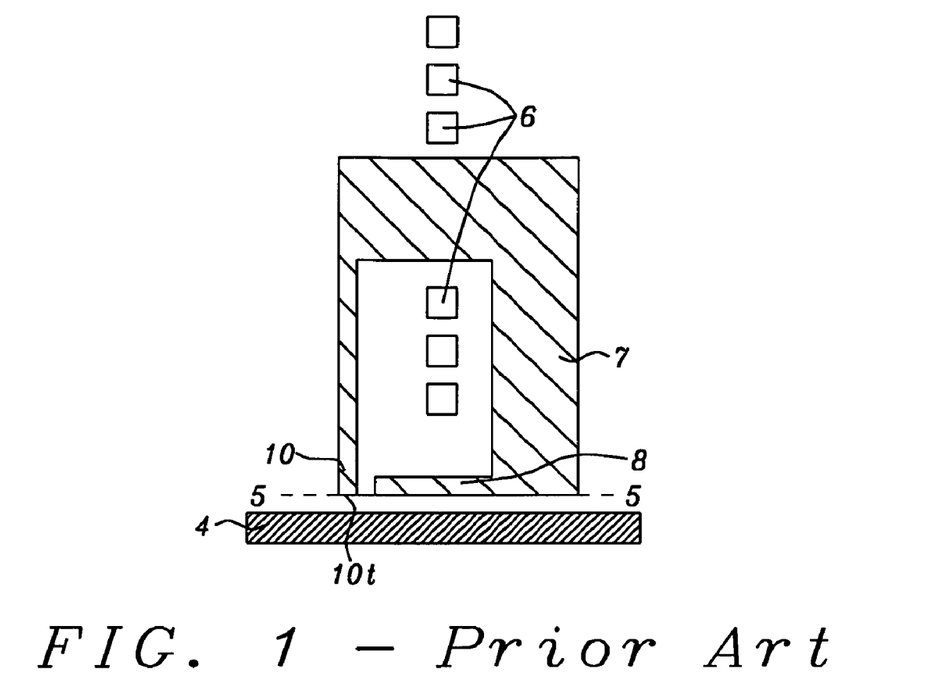
FIG. 1 is a cross-sectional view of a conventional PMR writer showing the main write pole, flux return pole, magnetic recording media, and coils that generate magnetic flux.

A conventional PMR write head as depicted in FIG. 1 typically has a main pole layer 10 or write pole with a pole tip 10t at an air bearing surface (ABS) 5 and a flux return pole (opposing pole) 8 which is magnetically coupled to the write pole through a trailing shield 7. Magnetic flux in the write pole layer 10 is generated by coils 6 and passes through the pole tip into a magnetic recording media 4 and then back to the write head by entering the flux return pole 8. The write pole concentrates magnetic flux so that the magnetic field at the write pole tip 10t at the ABS is high enough to switch magnetizations in the recording media 4. A trailing shield is added to improve the field gradient in the down-track direction.

Figure 2:
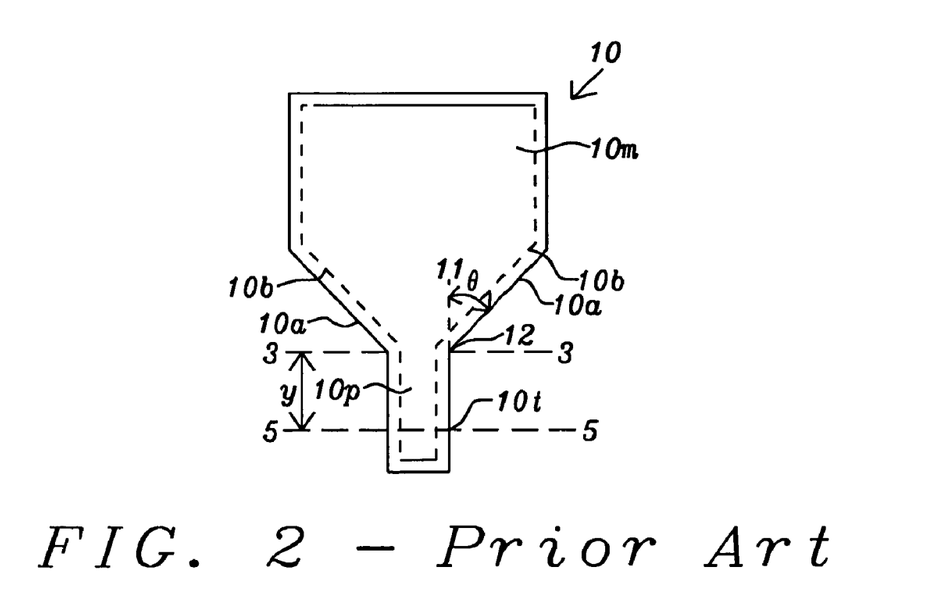
FIG. 2 is a top view showing a main write pole layer of a conventional PMR write head that has a narrow write pole section adjacent to the ABS and a larger yoke section with sides that flare outward at an angle θ from the sides of the narrow write pole.

Referring to FIG. 2, a top view is shown of a typical main pole layer 10 that has a large, wide portion called a yoke 10m and a narrow rectangular portion 10p called a write pole that extends a neck height (NH) distance y from the ABS plane 5-5 to a plane 3-3 parallel to the ABS where the pole intersects the yoke at the neck 12. The main pole layer 10 flares outward at an angle θ from a dashed line 11 that is an extension of one of the long rectangular sides of the pole 10p. PMR technologies require the write pole 10p at the ABS to have a beveled shape (as viewed from the ABS) so that the skew related writing errors can be suppressed. In other words, the top edge 10a of the main pole layer 10 usually overhangs the lower edge 10b by a certain amount.

Although a PMR head which combines the features of a single pole writer and a soft magnetic underlayer has a great advantage over LMR in providing higher write field, better read back signal, and potentially much higher areal density, PMR still faces some challenges. One major issue is related to trapezoidal write pole plating or the so-called through via plating in the semiconductor industry. In particular, there is a tendency to form void defects on the bottom and sidewalls of the write poles. Void defects are undesirable since they can lead to corrosion in the downstream slider process and adversely affect writer performance and wafer yields.

One cause of void defects is considered to be air bubbles trapped on the seed layer surface inside narrow openings when the wafer is submerged into a solution prior to plating. Poor wettability or hydrophobic characteristics of the seed layer make it difficult for small air bubbles to escape from a high aspect ratio cavity layer. In a conventional plating process, seed layer wettability is improved by the addition of excess surfactant such as sodium lauryl sulfate or sodium dodecyl sulfate to the plating solution. Unfortunately, surfactant may decompose during plating and can be co-deposited into the plated film. Higher surfactant loadings can easily raise the impurity level in the plated write pole and thereby lower its corrosion resistance and writability. Surfactant can also interact with other additives in the plating solution to form unwanted nodules in the plated film.

H. Gu et al. in U.S. Patent Application Publication 2007/0080067 provide a method for reducing the formation of void defects on the surface of a substrate during Cu plating by oxidation of the plating seed layer prior to substrate immersion. However, this method cannot be applied to high magnetic moment write pole plating where a Ru seed is generally used as a plating seed, write gap as well as a CMP stop layer. Oxidation of a Ru seed layer forms ruthenium oxides on the plating seed surface which improves the seed wettability in plating solution. However, the plated high magnetic moment materials such as CoFe adhere poorly to ruthenium oxides, resulting in plated film delamination. Furthermore, ruthenium oxides cannot be removed by immersion in an acidic plating solution typically used for write pole formation.

In U.S. Pat. No. 7,449,098, a method is disclosed whereby a metal is selectively plated into recessed regions. An additive such as an alkanesulfonic acid becomes selectively attached to the surface of recessed regions by selective removal from exposed regions using a mechanical rubbing process with a pad. The additive increases the rate of metal plating on recessed surfaces compared with exposed surfaces to minimize the amount of excess plated metal to be removed in a subsequent process.

U.S. Pat. No. 7,442,267 describes a method of annealing a Ru seed layer in an oxygen free atmosphere to reduce oxides and thereby reducing Ru resistivity before immersing the substrate in a plating solution. Related patent application Ser. No. 10/915,865 teaches a multi-step immersion process during plating to minimize bubble formation on electroplated surfaces.

SUMMARY OF THE INVENTION

One objective of the present invention is to provide a method for minimizing void formation in recessed cavities during a plating operation to form a write pole in a perpendicular magnetic recording device.

Another objective of the present invention is to provide a method of forming a PMR write pole according to the first objective that is cost effective and does not introduce impurities that can degrade device performance or lower wafer yields.

According to one embodiment of the present invention, these objectives are realized by first providing a substrate upon which a mold forming layer has been formed. For example, the substrate may be an etch stop layer. The mold forming layer may be a composite including an insulation layer such as alumina formed on the substrate and an upper Ta layer that serves as a hard mask and chemical mechanical polish (CMP) stop layer. A mold or opening for the main pole layer is formed in the mold forming layer by a sequence of photoresist imaging and etching steps. In one aspect, a photoresist layer is coated on the mold forming layer and patternwise exposed to form an opening in the shape of a main pole layer with yoke and pole sections that uncovers a portion of mold forming layer. Thereafter, the opening is transferred through the mold forming layer by a reactive ion etch (RIE) process that stops on the etch stop layer. Optionally, the mold formation sequence may include a first photoresist patterning and etching sequence followed by a second photoresist patterning and etching sequence to define different portions of the opening that correspond to different sections of the main pole layer. For example, the yoke opening may be formed in one patterning and etch sequence and the opening for the write pole section may be formed in a second patterning and etch sequence. The opening for the write pole section typically has a trapezoidal shape determined by sloped sidewalls that extend from the top surface of the mold forming layer to the substrate, a top opening within the top surface of the mold forming layer, and a bottom surface at the substrate. Preferably, the top opening has a greater width along the ABS than the bottom surface in the write pole opening.

After the photoresist layer is removed above the mold opening, a conformal alumina layer may be deposited on the surface of the mold forming layer, on the sloped sidewalls within the opening, and on exposed regions of the substrate. In one aspect, the alumina layer may be formed by atomic layer deposition (ALD) with a thickness that may be varied to adjust the track width. Then a Ru seed layer may be deposited on the conformal alumina layer by a sputter deposition method, chemical vapor deposition (CVD), physical vapor deposition (PVD), or ALD method, for example. A key feature of the present invention is the deposition of an auxiliary layer on the Ru seed layer. The auxiliary layer may be laid down in-situ in the same sputter deposition, CVD, PVD, or ALD chamber as the Ru seed layer to optimize throughput and thereby form a conformal layer along the sidewalls and bottom of the write pole opening, and along the top surface of the mold forming layer. Alternatively, the auxiliary layer may be formed by an electroplating or electroless plating process. Preferably, the auxiliary layer has a thickness from 10 to 1000 Angstroms and a composition represented by $Co_xNi_yFe_z$ or an oxide or an alloy thereof where each of x, y, and z is from 0 to 100 atomic % and x+y+z=100 atomic %. In a preferred embodiment, the auxiliary layer is comprised of the same material that will be subsequently deposited to form a write pole layer.

Thereafter the wafer is immersed in a plating solution. After a certain amount of time, an activation step is performed to remove a portion or all of the auxiliary layer. The extent and rate of auxiliary layer removal is determined by the activation current in direct current (DC), or one or both of pulsed current (PC) and pulse reversal (PR) form, and by the length of time the activation current is applied. In one aspect, the activation current has a small negative value and the plating current has a (+) value. Once the activation step is completed, the main pole layer including the write pole is electroplated in the opening to a level that completely fills the opening and extends a certain distance above the opening. Subsequent steps follow a conventional process flow such as annealing, and performing a CMP step to planarize the main pole layer.

DETAILED DESCRIPTION OF THE INVENTION

The present invention is a method of forming a write pole in a PMR write head that minimizes or eliminates common defects such as voids and impurities in the write pole layer. Note that the words mold and opening are used interchangeably when referring to the cavity in which the write pole is formed. The write head described in the exemplary embodiment may be part of a merged read-write head configuration.

Figure 3:
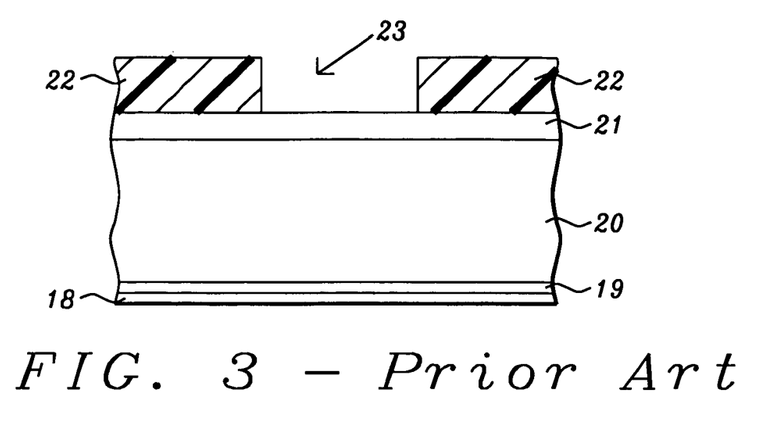
FIGS. 3-7 are cross-sectional views representing a process flow sequence according to a prior art method where electroplating of a write pole layer is performed directly on a seed layer in a recessed opening.

FIGS. 3-7 are cross-sectional views from an ABS that relate to a process sequence previously practiced by the inventors illustrating a method for forming a write pole. It should be understood that a write pole is typically formed simultaneously with a yoke portion of a main pole layer. Referring to FIG. 3, a first step involved in forming an opening for a write pole is depicted. There is a substrate 18 such as AlTiC on which an etch stop layer 19 otherwise known as a RIE resistant layer is deposited. The RIE resistant layer 19 with a thickness of 200 to 1000 Angstroms may formed on the substrate 18 by a sputter deposition or PVD process, for example, and preferably includes a material such as Ru or NiCr that has a high etch selectivity relative to an insulating layer made of alumina or the like during a subsequent RIE etch that uses $BCl_3$, chlorine, and fluorocarbon gases. In the exemplary embodiment, an insulation layer 20 is formed on the RIE resistant layer 19 and may be comprised of $Al_2O_3$ or silicon oxide that is deposited by a PVD process, a sputtering technique, or the like in the same deposition tool as the RIE resistant layer. The insulation layer 20 may also be made of other dielectric materials known in the art.

In one embodiment, a hard mask 21 made of Ta, for example, is formed on the insulation layer 20. The hard mask is advantageously employed in a subsequent RIE step where an opening is transferred into the insulation layer. Together, hard mask 21 and insulation layer 20 may be considered a composite mold forming layer and have a combined thickness essentially equivalent to the desired thickness of the write pole and main pole layer to be deposited in a later step. A photoresist layer 22 is coated on hard mask 21 and a well known lithography technique is used to form a pattern including an opening 23 that preferably comprises the shape of the write pole to be formed in subsequent steps. In one embodiment, opening 23 extends beyond a neck height distance from the ABS and also comprises a cavity (not shown) for the yoke portion of the main pole layer.

In another embodiment, two photoresist patterning and etching sequences may be used to form different sections of opening 23. For example, in Headway patent application Ser. No. 11/820,962, a two mask process is disclosed that provides an advantage of improving dimensional control of the pole by minimizing the effect of ABS positioning errors. In this example, a first photoresist layer is patterned and etched to form a rectangular shape that corresponds to the write pole section of the main pole layer. The rectangular shape is transferred through the insulation layer by a RIE process comprising $BCl_3$, $Cl_2$, and a fluorocarbon gas to generate a trench with beveled sidewalls. Thereafter, the first photoresist layer is removed and a second photoresist layer is coated on the insulation layer and patterned to form a yoke shape opening that is partially superimposed over the rectangular trench. A second etch process involving $BCl_3$ and $Cl_2$ may be employed to transfer the yoke shape opening through the insulation layer and form essentially vertical sidewalls in the yoke section of the mold for the main pole layer.

Figure 4:
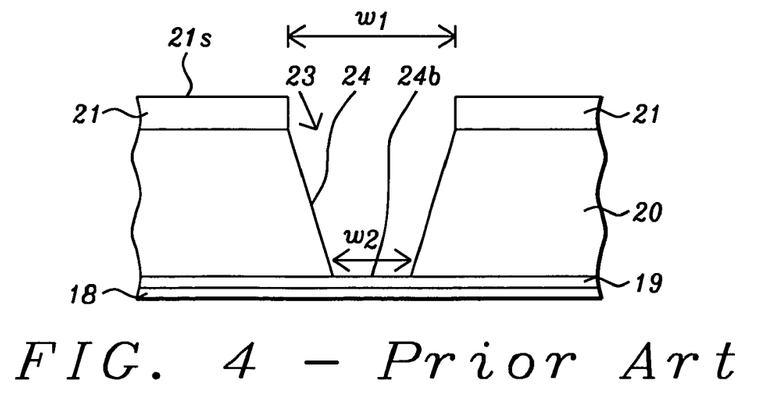

Referring to FIG. 4, the pattern including opening 23 in photoresist layer 22 is transferred through hard mask 21 by a first etching step that is preferably a RIE process to accurately reproduce the opening in the hard mask. The first etch stops on the insulation layer 20. Following the first etch step, the photoresist is stripped by a conventional method. Then, a second etch step is performed to transfer the opening 23 through the insulation layer 20 and stops on RIE resistant layer 19. Note the lower portion of opening 23 within insulation layer 20 has sloped sidewalls 24 that extend from a bottom surface of the hard mask 21 to the RIE resistant layer 19. The slope of the sidewalls may be adjusted by changing RIE conditions such as gas chemistry, pressure, and RF power. As a result, the width $w_1$ at the top of opening 23 is greater than the width $w_2$ along the bottom surface 24b of the opening and the lower portion of the opening has a trapezoidal shape.

Figure 5:
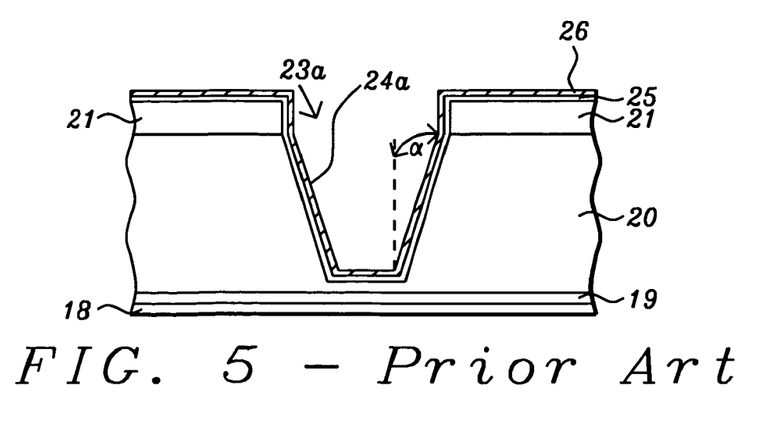

Referring to FIG. 5, a dielectric layer 25 such as alumina may be deposited by an ALD method to form a conformal film on the top surface 21s, on bottom surface 24b, and along sidewalls 24 in opening 23. The primary purpose of the conformal dielectric layer 25 is to adjust the width of opening 23 prior to seed layer deposition. For instance, if the patterning and etch sequence described previously generates an opening 23 having a width $w_1$ larger than a target value, then the thickness of dielectric layer 25 may be increased to compensate for a larger than desired size for width $w_1$. Thereafter, a seed layer 26 which is preferably Ru is formed on dielectric layer 25 by an ALD method, sputter deposition process, or another technique. Preferably, a deposition method is selected that forms a conformal seed layer 26 on dielectric layer 25. As a result, opening 23a has a width along the top surface 26s of less than $w_1$ and is bounded on the sides by sidewalls 24a that are sloped at an angle a of about 5 to 20 degrees with respect to a plane formed perpendicular to the RIE resistant layer 19. The write pole which will be deposited in a later step will have a beveled shape with an angle a with respect to a plane formed perpendicular to the ABS so that the skew related writing errors can be suppressed.

Figure 6:
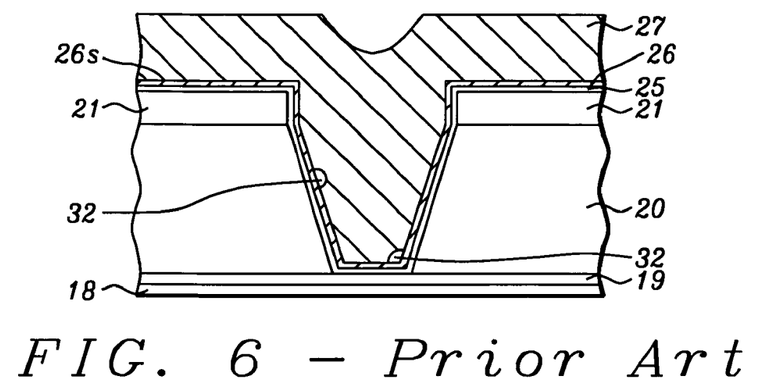

Referring to FIG. 6, the wafer comprising substrate 18 is immersed in a plating solution and an electroplating process is performed to deposit a magnetic layer 27 that fills opening 23a (FIG. 5) and also covers the top surface 26s of the seed layer 26. As mentioned earlier, a Ru seed layer 26 typically has poor wettability characteristics that enables air bubbles (not shown) to be trapped along sidewalls 24a when submerged in a plating solution. During plating of magnetic layer 27, the bubbles may cause voids 32 to form along sidewalls 24a or at the bottom of opening 23a as the opening is filled with plated material. Adding excess surfactant to the plating solution may decrease void formation somewhat but in turn increases the likelihood of surfactant or other additives being included in the plated magnetic layer 27.

Figure 7:
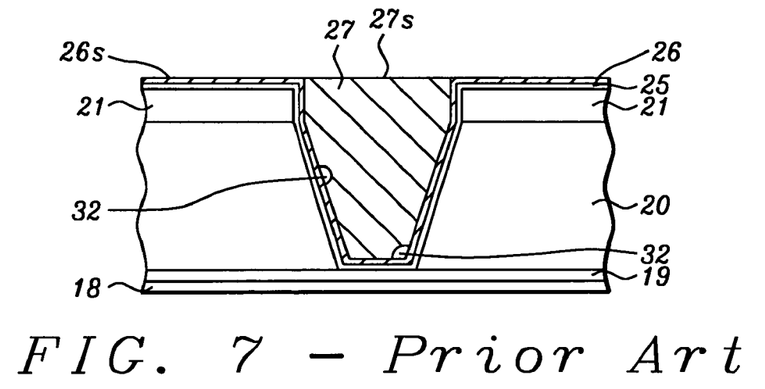

As shown in FIG. 7, voids remain in the write pole 27p after the plated magnetic layer is planarized by a CMP process to form a top surface 27s that is essentially coplanar with top surface 26s of the seed layer. Even if voids are reduced by employing additional surfactant in the plating solution, write pole performance is degraded because of extra impurities included in the magnetic material.

We have discovered a new process sequence for forming a write pole that reduces or minimizes voids without the need for elevated surfactant levels. The process sequence can be readily implemented in existing fabrication lines at minimal cost since existing equipment and materials may be utilized without significantly affecting throughput.

Figure 9:
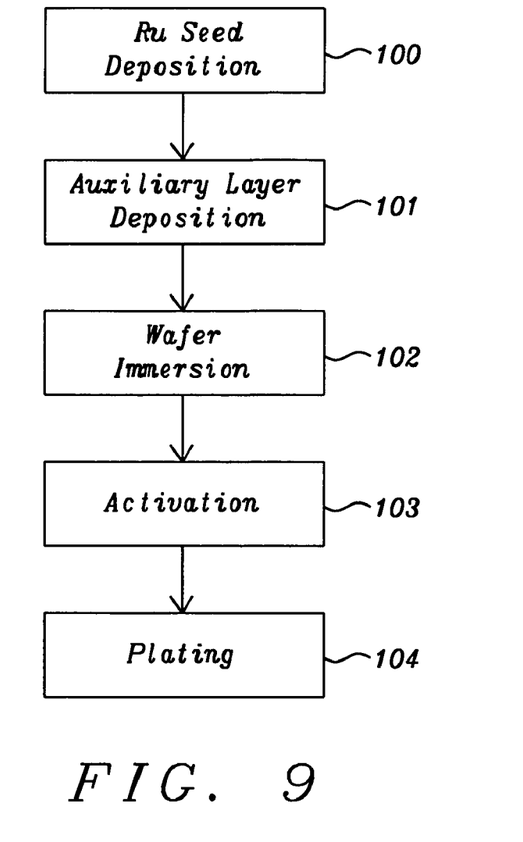
FIG. 9 is a process flow diagram that illustrates a sequence of steps starting from seed layer formation in a write pole opening through the electroplating of a write pole according to a method of the present invention.

Referring to FIG. 9, the process flow of the present invention begins at a stage where an opening has been formed in a mold forming layer such as represented by FIG. 4. In step 100, a seed layer that is preferably Ru is deposited in a conformal manner in opening 23 and on the top surface of a mold forming layer by a technique as previously described. The following step 101 is a key feature of the present invention wherein an auxiliary layer is deposited on the seed layer along the sidewalls and bottom of the opening and on a top surface that is parallel to the plane of the substrate. Preferably, the auxiliary layer is comprised of the same magnetic material that will be used to form the write pole in a subsequent step. For increased throughput, the auxiliary layer may be laid down in the same ALD, CVD, ion beam deposition, or sputter deposition chamber as the seed layer. In step 102, the wafer comprising the opening in a mold forming layer and stack of seed layer/auxiliary layer formed therein is immersed in a plating solution. Thereafter, in step 103, a first current or voltage may be applied to the substrate in the plating solution to remove part or all of the auxiliary layer. Finally, step 104 involves applying a second current or voltage of opposite sign to the substrate to fill the opening with electroplated magnetic material. As indicated earlier with regard to FIG. 7, a CMP process may be used to planarize the electroplated material so that the write pole has a top surface which is coplanar with a top surface of the seed layer.

The present invention also encompasses an embodiment wherein step 101 comprises an electroplating or electroless plating process to deposit an auxiliary layer on the seed layer surface. When step 101 is performed by an electroplating operation, step 102 may be omitted from the sequence since the wafer is already immersed in a plating solution during the auxiliary layer deposition. Once the auxiliary layer is formed, all or a top portion of the auxiliary layer may be removed in the same plating solution (step 103) by reversing the current or voltage used for step 101. Then step 104 may be performed in the same plating solution as used for steps 101 and 103 to improve throughput for the overall process sequence. Therefore, a positive current may be applied in steps 101 and 104, and a negative current is applied in step 103. In an embodiment where step 101 is accomplished by an electroless process, then steps 102-104 are performed as indicated previously in the exemplary embodiment. Furthermore, an additional step (not shown) may be inserted between steps 101 and 102 to rinse the electroless plating solution from the wafer before it is immersed in an electroplating solution so as not to contaminate the electroplating solution with material from the electroless plating solution.

Figure 10:
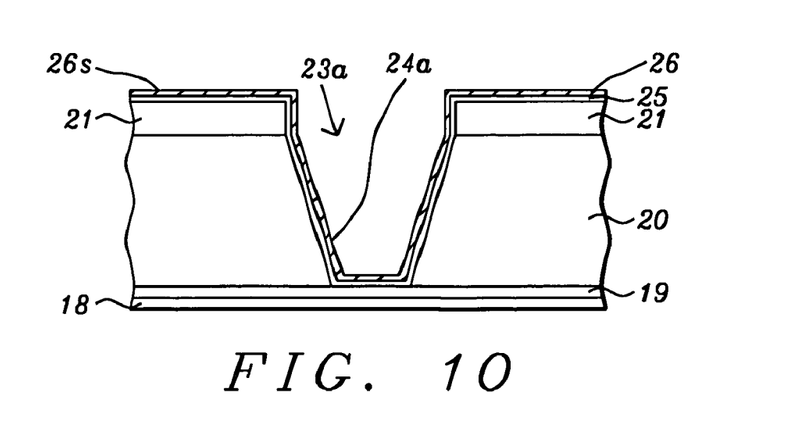
FIG. 10 is a cross-sectional view that shows the formation of a conformal Ru seed layer in a recessed opening according to an intermediate step of the present invention.

Each of the steps 100-104 is described in more detail with regard to FIGS. 10-13. In FIG. 10, a dielectric layer 25 and seed layer 26 are sequentially formed on the top surface of a hardmask and along the sidewalls and bottom of an opening according to a previously described procedure practiced by the inventors. As a result, there is an exposed top surface 26s of the seed layer, and an opening 23a having sidewalls 24a is formed in the composite mold forming layer that includes insulation layer 20 and hard mask 21. In a preferred embodiment, the dielectric layer 25 is made of alumina and has a thickness in the range of 10 to 1000 Angstroms and the seed layer 26 is comprised of Ru and may have a thickness between 400 and 700 Angstroms, for example.

Figure 11:
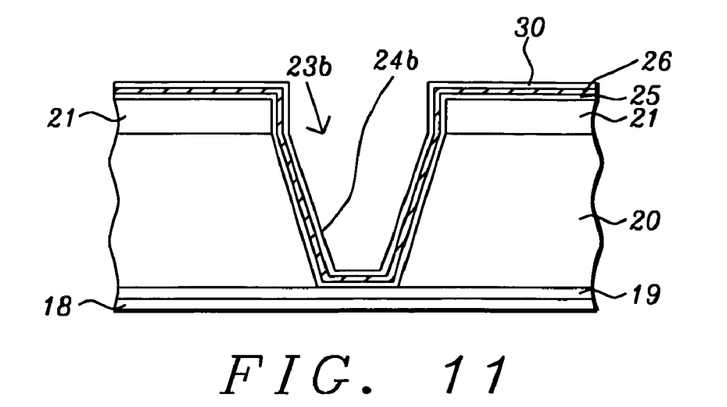
FIG. 11 is a cross-sectional view showing the formation of an auxiliary layer on the Ru seed layer in FIG. 10 according to an intermediate step of the present invention.

Referring to FIG. 11, an auxiliary layer 30 having a thickness from 10 to 1000 Angstroms is deposited on the top surface 26s of the seed layer and preferably forms a conformal film thereon and on the sidewalls 24a (FIG. 10) to generate new sidewalls 24b and an opening 23b that is smaller than opening 23a. In one embodiment, the auxiliary layer 30 preferably has a composition represented by $Co_xFe_yNi_z$ or oxides thereof wherein each of x, y, and z is from 0 to 100 atomic % and x+y+z=100 atomic %. In an alternative embodiment, the auxiliary layer 30 is an alloy of $Co_xFe_yNi_z$ that may include one or more elements selected from V, Hf, Zr, W, Nb or the like. Targets for Co, Fe, Ni, and alloys thereof are already available for sputter depositing magnetic layers in a read head so no new materials are required to deposit the auxiliary layer. Preferably, the auxiliary layer is comprised of the same material as selected for the write pole to be electroplated in a subsequent step so as not to introduce additional elements in the electroplating solution. After a single pump down step, the auxiliary layer may be deposited in the same ALD, CVD, ion beam deposition, or sputter deposition chamber as employed for the seed layer deposition.

Figure 12:
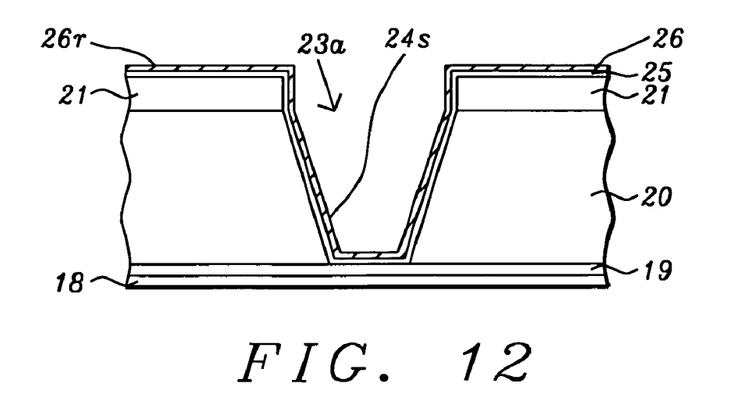
FIG. 12 is a cross-sectional view of the structure in FIG. 11 after the auxiliary layer has been removed according to one embodiment of the present invention.

Referring to FIG. 12, one embodiment of the present invention is depicted where the auxiliary layer 30 is completely removed by immersing the wafer comprising the structure shown in FIG. 11 in an electroplating solution. A small current or voltage with a (−) value may be applied for a certain period of time called "activation time" to remove the auxiliary layer in a controlled manner. The current may be direct current (DC), pulsed current (PC), or a pulse reversal (PR) current with a DC form being preferred. Furthermore, a combination of PR and PC current may be applied. In one aspect, the auxiliary layer 30 is completely removed to regenerate an opening 23a with sidewalls 24s. Note that the top surface 26r and sidewalls 24s have improved wettability and are less hydrophobic compared with original top surface 26s and sidewalls 24a since the top surface 26r and sidewalls 24s have been formed while immersed in a plating solution in the absence of air that can form trapped air bubbles in opening 23a. Although the auxiliary layer 30 may be removed in one electroplating solution and the write pole may be deposited in a second electroplating solution, the use of different electroplating solutions for steps 103 and 104 is not recommended since the freshly generated surface 24s is exposed once again to air that could be trapped in opening 23a upon transfer and immersion into another electroplating bath.

Figure 8:
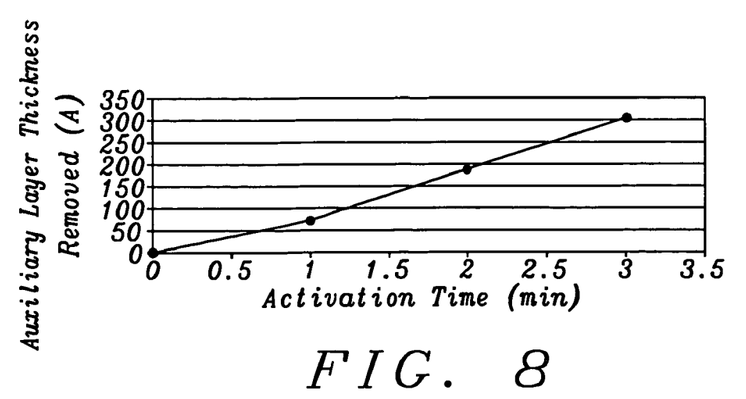
FIG. 8 is a plot showing the effect of activation time on the extent of auxiliary layer removal according to a method of the present invention.

In FIG. 8, a graph is provided that shows the rate of auxiliary layer removal in an example where about 300 Angstroms is stripped during an activation time of 3 minutes. Thus, a removal rate of about 100 Angstroms per minute is realized when a DC current of about (−) 40 milliamps is applied in this example. In other words, the activation step where the auxiliary layer is partially or totally removed is controlled by activation time which is the time the applied current or voltage is applied during the activation step.

Figure 13:
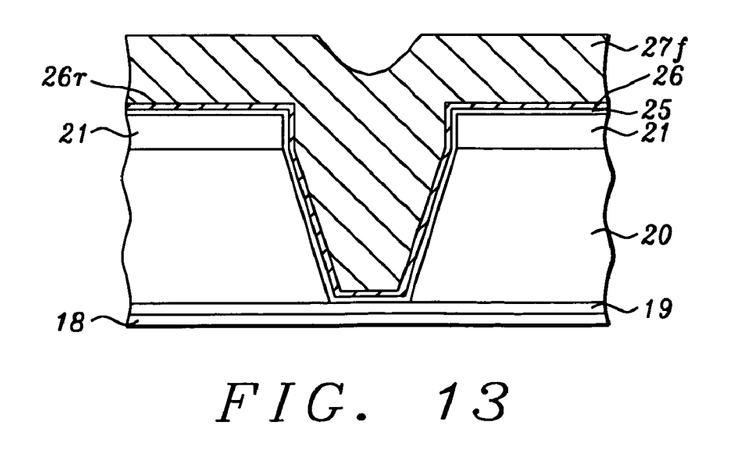
FIG. 13 is a cross-sectional view of the structure in FIG. 12 after a magnetic layer is electroplated in the recessed cavity according to a method of the present invention.

Referring to FIG. 13, a magnetic layer 27f is electroplated to fill the opening 23a and cover top surface 26r. Because of the process of forming a seed layer surface in-situ in the electroplating solution, the number of air bubbles trapped within opening 23a is significantly reduced or eliminated which in turn prevents voids from forming within magnetic layer 27f. In a following step (not shown), a CMP process may be performed to remove excess magnetic layer 27f and form a top surface thereof that is coplanar with top surface 26r. Total thickness of the resulting write pole is typically about 2 microns but may be adjusted higher or lower to modify the performance of the PMR writer as appreciated by those skilled in the art.

In an embodiment wherein the auxiliary layer 30 is only partially removed prior to electroplating the write pole, the auxiliary layer serves as a seed layer for deposition of magnetic layer 27f. However, a seed layer 26 with a fcc or hexagonal crystal structure is still required to enable formation of a uniform auxiliary layer with a crystal structure that will promote a smooth and uniform magnetic layer 27f.

In addition to the reduction or elimination of void defects in a write pole formed according to an embodiment of the present invention, improved write pole performance is achieved and enhanced wafer yields are realized. In particular, elevated levels of surfactant in the plated solution can be avoided to reduce impurities in the electroplated material and fewer PMR heads are rejected due to degraded performance. Furthermore, the write pole formation sequence disclosed herein does not rely on oxidation of a seed layer surface that has a tendency to cause poor adhesion of the plated write pole layer.

While this invention has been particularly shown and described with reference to, the preferred embodiment thereof, it will be understood by those skilled in the art that various changes in form and details may be made without departing from the spirit and scope of this invention.

We claim:

1. A method of forming a write pole in a perpendicular magnetic recording head, comprising:
    (a) forming an opening in a mold forming layer having a top surface, said opening has a bottom that exposes a portion of a substrate and has sidewalls that extend from the top surface to said substrate;
    (b) forming a conformal Ru seed layer along the top surface and sidewalls, and on the bottom of the opening in a deposition chamber;
    (c) depositing an auxiliary layer on the seed layer in the deposition chamber wherein said auxiliary layer conforms to a top surface of the seed layer and has a composition represented by $Co_xFe_yNi_z$ or oxides or alloys thereof wherein each of x, y, and z is from 0 to 100 atomic % and x+y+z=100 atomic %;
    (d) removing all or a portion of the auxiliary layer in an electroplating solution; and
    (e) performing an electroplating process in said electroplating solution that deposits a magnetic material which fills said opening.

2. The method of claim 1 wherein the mold forming layer is a composite layer comprised of a lower alumina layer and an upper Ta layer.

3. The method of claim 1 wherein the auxiliary layer has a thickness between about 10 and 1000 Angstroms.

4. The method of claim 1 wherein both of the seed layer and auxiliary layer are deposited in the same chamber after a single pump down process by a CVD, ALD, sputter deposition, or ion beam deposition technique.

5. The method of claim 1 wherein the auxiliary layer removal includes applying a first current or voltage to the substrate in the electroplating solution during an activation step and electroplating the magnetic material comprises applying a second current or voltage to the substrate in said electroplating solution, the second current has a sign opposite to that of the first current.

6. The method of claim 5 wherein the first current is direct current (DC), pulsed current (PC), pulsed reversal (PR) current, or a combination of PC and PR current.

7. The method of claim 5 wherein the activation step is controlled by activation time which is the time the negative current or voltage is applied.

8. The method of claim 1 further comprised of performing a chemical mechanical polish process to planarize the magnetic material electroplated in said opening.

9. The method of claim 1 wherein the opening has a trapezoidal shape where a top of the opening has a greater width than the bottom of the opening.

10. The method of claim 1 wherein the auxiliary layer and the electroplated magnetic material have the same composition.

11. A method of forming a write pole in a perpendicular magnetic recording head, comprising:
 (a) forming an opening in a mold forming layer having a top surface, said opening has a bottom that exposes a portion of a substrate and has sidewalls that extend from the top surface to said substrate;
 (b) forming a conformal Ru seed layer along the top surface and sidewalls, and on the bottom of the opening;
 (c) depositing an auxiliary layer on the seed layer by an electroless method wherein said auxiliary layer conforms to a top surface of the seed layer and has a composition represented by $Co_xFe_yNi_z$ or oxides or alloys thereof wherein each of x, y, and z is from 0 to 100 atomic % and x+y+z=100 atomic %;
 (d) removing all or a portion of the auxiliary layer in an electroplating solution; and
 (e) performing an electroplating process in said electroplating solution that deposits a magnetic material which fills said opening.

12. The method of claim 11 wherein the mold forming layer is a composite layer comprised of a lower alumina layer and an upper Ta layer.

13. The method of claim 11 wherein the auxiliary layer has a thickness between about 10 and 1000 Angstroms.

14. The method of claim 11 wherein the auxiliary layer removal includes applying a first current or voltage to the substrate in the electroplating solution during an activation step and electroplating the magnetic material comprises applying a second current or voltage to the substrate in said electroplating solution, the second current has a sign opposite to that of the first current.

15. The method of claim 14 wherein the first current is direct current (DC), pulsed current (PC), pulsed reversal (PR) current, or a combination of PC and PR current.

16. The method of claim 14 wherein the activation step is controlled by activation time which is the time the negative current or voltage is applied.

17. The method of claim 11 further comprised of performing a chemical mechanical polish process to planarize the magnetic material electroplated in said opening.

18. The method of claim 11 wherein the opening has a trapezoidal shape where a top of the opening has a greater width than the bottom of the opening.

19. The method of claim 11 wherein the auxiliary layer and the electroplated magnetic material have the same composition.

20. The method of claim 19 wherein the auxiliary layer and electroplated magnetic material are an alloy of $Co_xFe_yNi_z$ that includes one or more elements selected from V, Hf, Zr, W, and Nb.

21. The method of claim 11 further comprising a step of rinsing the substrate after the electroless plating process and before removing all or a portion of the auxiliary layer in an electroplating solution.

* * * * *